United States Patent
Wada et al.

(10) Patent No.: US 7,007,713 B2
(45) Date of Patent: Mar. 7, 2006

(54) PRESSURE CONTROL APPARATUS

(75) Inventors: Toshiharu Wada, Yawara-mura (JP); Mitsutoshi Araki, Yawara-mura (JP); Shinichi Ito, Yawara-mura (JP)

(73) Assignee: SMC Corporation, Tokyo (JP)

( * ) Notice: Subject to any disclaimer, the term of this patent is extended or adjusted under 35 U.S.C. 154(b) by 278 days.

(21) Appl. No.: 10/465,709

(22) Filed: Jun. 19, 2003

(65) Prior Publication Data

US 2004/0000340 A1    Jan. 1, 2004

(30) Foreign Application Priority Data

Jun. 27, 2002  (JP)  .............................. 2002-187538

(51) Int. Cl.
*G05D 16/16*  (2006.01)

(52) U.S. Cl. ................. 137/495; 137/271; 137/505.14; 137/505.29; 137/557

(58) Field of Classification Search ................ 137/495, 137/505.14, 505.37, 505.29, 557, 269, 271
See application file for complete search history.

(56) References Cited

U.S. PATENT DOCUMENTS

| | | | | |
|---|---|---|---|---|
| 625,325 A | * | 5/1899 | Craig | .......................... 137/269 |
| 763,375 A | * | 6/1904 | Dodgson | ................ 137/505.37 |
| 1,764,790 A | * | 6/1930 | Hook et al. | .................. 137/495 |
| 1,874,293 A | * | 8/1932 | Hook et al. | ............... 137/487.5 |
| 4,915,126 A | * | 4/1990 | Gyllinder | ..................... 137/495 |
| 5,427,350 A | * | 6/1995 | Rinkewich | ............. 137/625.22 |

FOREIGN PATENT DOCUMENTS

JP    H172612    5/1989

\* cited by examiner

*Primary Examiner*—Stephen M. Hepperle
(74) *Attorney, Agent, or Firm*—Baker Botts LLP

(57) ABSTRACT

The present invention provides a pressure control apparatus for controlling the pressure at an output port without reducing the effective sectional area by controlling a main valve through the switching operation of a small-sized directional control valve, wherein the main valve has any of the following functions, i.e. a function of-providing a valve full-open position, a function of reducing pressure, and a function of providing a valve full-closed position. When a diaphragm chamber is placed at the secondary pressure by switching the directional control valve, the primary pressure is reduced by the main valve, and a predetermined reduced pressure is outputted. When the diaphragm chamber is at the primary pressure, the main valve is fully closed. When the diaphragm chamber is at the atmospheric pressure, the main valve fully opens, and hence the primary-side fluid flows to the output port as it is.

6 Claims, 5 Drawing Sheets

PRESSURE CONTROL APPARATUS

BACKGROUND OF THE INVENTION

1. Field of the Invention

The present invention relates to a pressure control apparatus for controlling the pressure at an output port by controlling a main valve through the switching operation of a directional control valve.

2. Discussion of Related Art

FIG. 5 shows a conventional pressure control apparatus for controlling the pressure at an output port to either of two pressures, i.e. high and low pressures, by controlling a main valve and a discharge valve through the switching operation of a directional control valve [see Japanese Utility Model Application Public Disclosure (KOKAI) No. Hei 1-72612]. In FIG. 5, a directional control valve 140 has a small input port 141, a small output port 142 and a small discharge port 143. In a state where the small output port 142 is communicated with the small discharge port 143, a pressure fluid is supplied to a supply port P. A pressure regulating member 125 is in the position shown in the figure. The supplied pressure fluid opens a main valve element 114 to flow to an output port A and also passes through a feedback passage 120 to flow into a feedback chamber (diaphragm chamber) 119. Consequently, the fluid pressure in the feedback chamber 119 rises. When the pressure in the feedback chamber 119 reaches a first set pressure (a set low pressure), a diaphragm 118 moves to a neutral position, causing the main valve (114, 113) to be closed. When the fluid pressure at the output port A becomes lower than the first set pressure, the main valve (114, 113) opens to allow the pressure fluid to flow to the output port A. When the fluid pressure at the output port A becomes higher than the first set pressure, the main valve (114, 113) is closed, and a discharge valve (122, 121) opens. Consequently, the pressure fluid at the output port A is discharged. In this way, the fluid pressure at the output port A is controlled to the first set pressure.

Next, when the directional control valve 140 is switched to allow the small output port 142 to communicate with the small input port 141, the pressure fluid from the supply port P flows into a pressure setting chamber 127 through the small input port 141 and the small output port 142. Consequently, the fluid pressure in the pressure setting chamber 127 rises, causing the pressure regulating member 125 to move downward. The pressure regulating member 125 stops when it abuts against an engagement portion 136 of a high-pressure setting member 135. The downward movement of the pressure regulating member 125 compresses a pressure setting spring 128 and hence increases the urging force of the pressure setting spring 128 acting on the diaphragm 118. The increase in the urging force of the pressure setting spring 128 allows the fluid pressure at the output port A to be controlled to a second set pressure (a set high pressure).

With the prior art shown in FIG. 5, a pressure fluid at either of the first and second set pressures is obtained, and each set pressure is controlled to a constant pressure by feedback control. However, the feedback control is not always needed for some use applications of the fluid pressure cylinder. A first example of such use applications is as follows. During a stroke L1 of the full stroke L of the piston of the fluid pressure cylinder, the main valve is fully opened to move the piston at high speed, thereby shortening the stroke time. During the remaining stroke L2, the piston is moved at a set pressure to control pressing force (e.g. a caulking machine). Alternatively, during the stroke L1, the piston is activated at a set low pressure to ensure safety. During the remaining stroke L2, the main valve is fully opened to activate the piston at high pressure (e.g. an automatic door). In a second example, a fluid at a set pressure is supplied for a desired period of time. Thereafter, the flow of the fluid is stopped (e.g. an air blower or a fluid pressure motor). The prior art shown in FIG. 5 has functions more than is needed for the first and second examples. Therefore, application of the prior art to the first or second example is a waste of its capabilities.

SUMMARY OF THE INVENTION

The present invention was made to eliminate the above-described waste.

A first object of the present invention is to provide a pressure control apparatus for controlling the pressure at an output port by controlling a main valve through the switching operation of a directional control valve, wherein the main valve has any two or three of the following functions, i.e. a function of providing a valve full-open position, a function of reducing pressure, and a function of providing a valve full-closed position.

A second object of the present invention is to simplify the arrangement of the above-described pressure control apparatus and to reduce costs.

To attain the above-described objects, the present invention is applied to a pressure control apparatus having a main valve and a diaphragm provided in a pressure control apparatus body. The pressure control apparatus body is provided with a directional control valve (outside or inside the pressure control apparatus body or at an intermediate position between the outside and inside of it). The main valve is disposed in a passage for communication between a supply port and an output port. The diaphragm forms a diaphragm chamber. The main valve is urged in a direction in which it is closed by a valve spring. The main valve is also urged in a direction in which it opens by a pressure regulating spring acting on the diaphragm. Force acting on the diaphragm changes in accordance with the switching operation of the directional control valve, and hence the pressure at the output port changes.

According to a first arrangement of the present invention, the diaphragm chamber and a small output port of the directional control valve are communicated with each other. In accordance with the switching operation of the directional control valve, the diaphragm chamber is placed at any one of the secondary pressure (pressure at the output port), the atmospheric pressure, and the primary pressure (pressure at the supply port). When the diaphragm chamber is at the secondary pressure, the primary pressure flows to the output port after being reduced to a set pressure by the main valve. When the diaphragm chamber is at the atmospheric pressure, the main valve fully opens, and hence the pressure at the output port becomes equal to the primary pressure. When the diaphragm chamber is at the primary pressure, the main valve is fully closed.

According to a second arrangement of the present invention, a shell is disposed in the center of the diaphragm in the first arrangement. A stem is connected at the proximal end thereof to a main valve element of the main valve and disposed so that the distal end of the stem abuts against the shell.

According to a third arrangement of the present invention, the directional control valve in the first or second arrangement has two small input ports. One of the small input ports is communicated with the atmosphere, and the other of the small input ports is communicated with the output port of the pressure control apparatus body.

According to a fourth arrangement of the present invention, an adapter is provided on a side of the pressure control apparatus body in the third arrangement. The directional control valve is connected to the outside of the adapter. The small output port of the directional control valve is communicated with the diaphragm chamber through a first A output communicating passage formed in the adapter and a first B output communicating passage formed in the pressure control apparatus body. One of the small input ports of the directional control valve is communicated with the atmosphere through a first input communicating passage formed in the adapter. A second A input communicating passage is formed in the adapter, and a second B input communicating passage is formed in the pressure control apparatus body. The second A input communicating passage and the second B input communicating passage are communicated with each other through a communicating pipe. The other of the small input ports of the directional control valve is communicated with the output port of the pressure control apparatus body through the second A input communicating passage, the input communicating pipe and the second B input communicating passage.

According to a fifth arrangement of the present invention, the directional control valve in the first or second arrangement has two small input ports. One of the small input ports is communicated with the supply port of the pressure control apparatus body. The other of the small input ports is communicated with the output port of the pressure control apparatus body.

According to a sixth arrangement of the present invention, an adapter is provided on a side of the pressure control apparatus body in the fifth arrangement. The directional control valve is connected to the outside of the adapter. The small output port of the directional control valve is communicated with the diaphragm chamber through a first A output communicating passage formed in the adapter and a first B output communicating passage formed in the pressure control apparatus body. One of the small input ports of the directional control valve is communicated with the supply port of the pressure control apparatus body through a third A input communicating passage formed in the adapter and a third B input communicating passage formed in the pressure control apparatus body. A second A input communicating passage is formed in the adapter, and a second B input communicating passage is formed in the pressure control apparatus body. The second A input communicating passage and the second B input communicating passage are communicated with each other through a communicating pipe. The other of the small input ports of the directional control valve is communicated with the output port of the pressure control apparatus body through the second A input communicating passage, the input communicating pipe and the second B input communicating passage.

In addition, the present invention is applied to a pressure control apparatus having a main valve and a diaphragm provided in a pressure control apparatus body. The pressure control apparatus body is provided with directional control valve (outside or inside the pressure control apparatus body or at an intermediate position between the outside and inside of it). The main valve is disposed in a passage for communication between a supply port and an output port. The diaphragm forms a diaphragm chamber. The main valve is urged in a direction in which it is closed by a valve spring. The main valve is also urged in a direction in which it opens by a pressure regulating spring acting on the diaphragm. Force acting on the diaphragm changes in accordance with the switching operation of the directional control valve, and hence the pressure at the output port changes.

According to a seventh arrangement of the present invention, a central communicating passage is formed in the passage for communication between the main valve and the output port. Adapter connecting openings are formed in two side surfaces, respectively, of the pressure control apparatus body. The adapter connecting openings are communicated with the central communicating passage through respective pressure communicating passages. An adapter is connected to one of the adapter connecting openings. A pressure gauge is provided in the adapter. The pressure at the output port is transmitted to the pressure gauge through the central communicating passage and the pressure communicating passage. The other of the adapter connecting openings is closed with a blanking plate assembly.

According to the first and second arrangements, the pressure control apparatus controls the pressure at the output port by controlling the main valve through the switching operation of the directional control valve. When the diaphragm chamber is at the secondary pressure, the primary pressure flows to the output port after being reduced to a set pressure by the main valve. When the diaphragm chamber is at the atmospheric pressure, the main valve is fully open. Consequently, the pressure at the output port becomes equal to the primary pressure. When the diaphragm chamber is at the primary pressure, the main valve is fully closed. Because the pressure control apparatus does not need a high-pressure setting device, a pressure-setting chamber, etc. as required in the prior art, the structure is simplified, and the costs are reduced.

In the pressure control apparatus according to the third and fourth arrangements, when the diaphragm chamber is at the secondary pressure, the primary pressure flows to the output port after being reduced to a set pressure by the main valve. When the diaphragm chamber is at the atmospheric pressure, the pressure at the output port becomes equal to the primary pressure. The pressure control apparatus is applicable to a caulking machine, an automatic door, etc.

In the pressure control apparatus according to the fifth and sixth arrangements, when the diaphragm chamber is at the secondary pressure, the primary pressure flows to the output port after being reduced to a set pressure by the main valve. When the diaphragm chamber is at the primary pressure, the main valve is fully closed. The pressure control apparatus is applicable to an air blower, an air motor, etc.

In the pressure control apparatus according to the seventh arrangement, an adapter is connected to either of two adapter connecting openings, and the other adapter connecting opening is closed with a blanking plate assembly. Because the adapter can be connected to a desired one of the two adapter connecting openings, the degree of freedom with which to assemble the apparatus increases.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
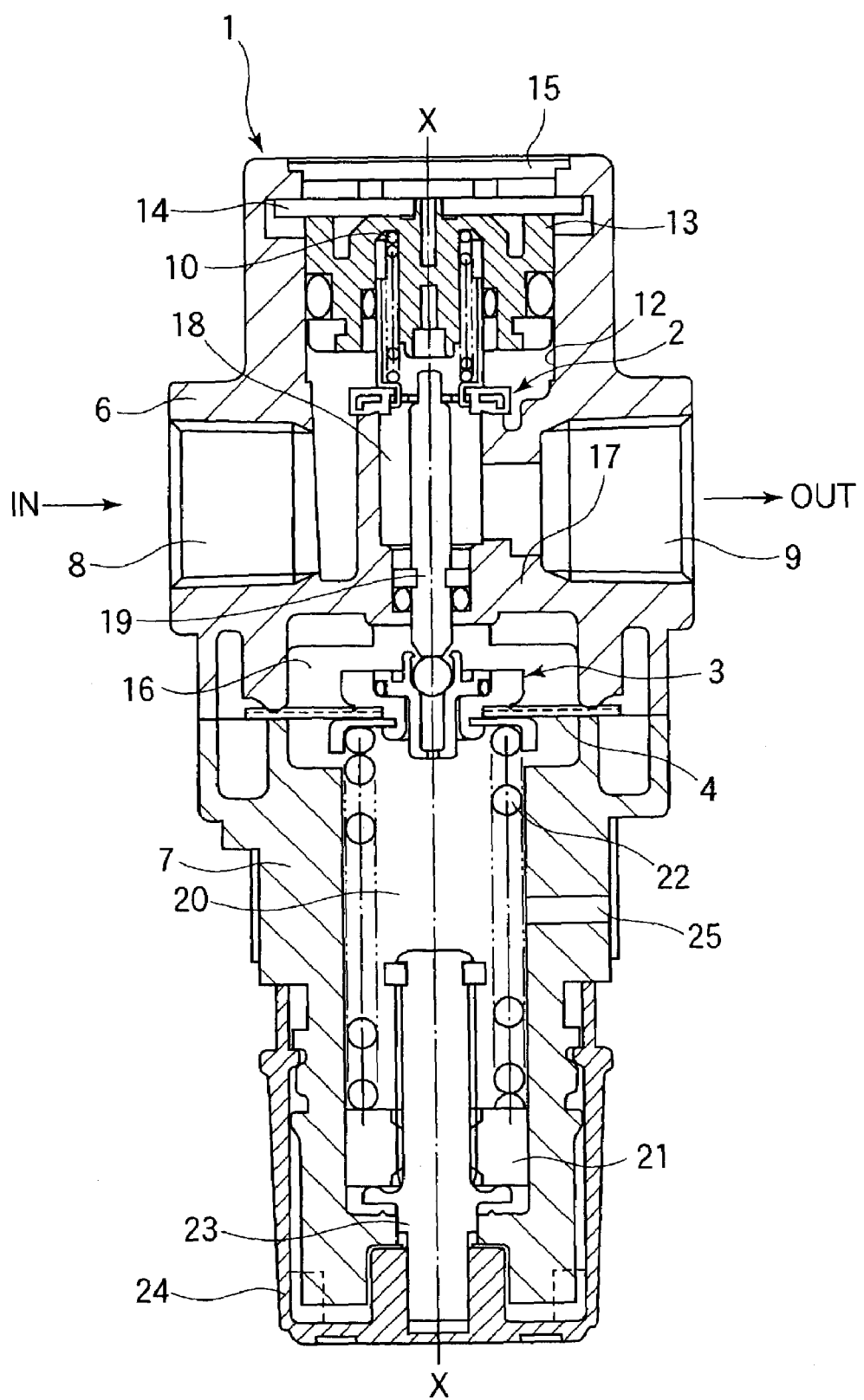
FIG. 1 is a sectional side view showing first and second embodiments of the pressure control apparatus according to the present invention.
Figure 2:
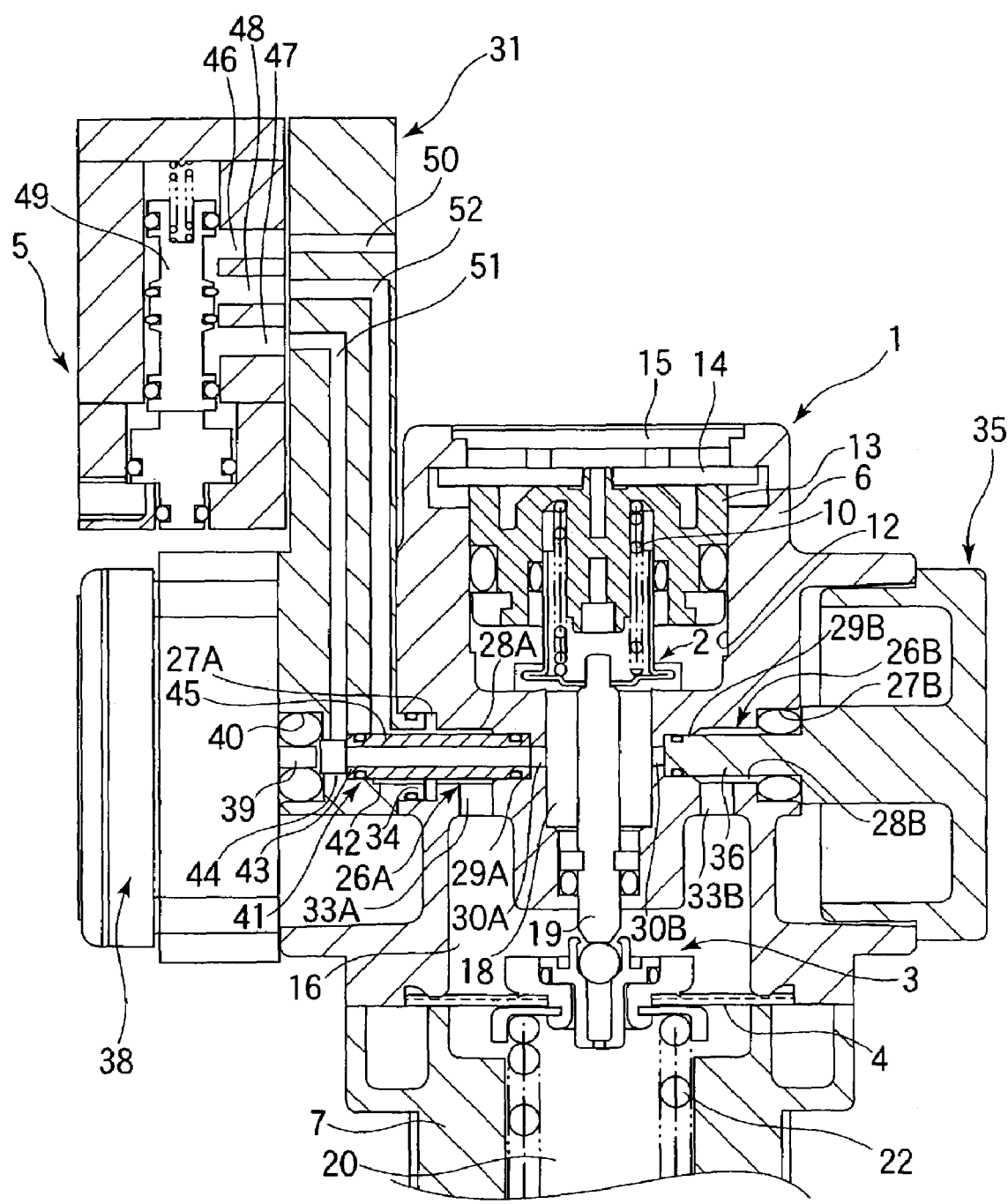
FIG. 2 is a sectional view taken along the line X—X in FIG. 1, showing the first embodiment.
Figure 4A:
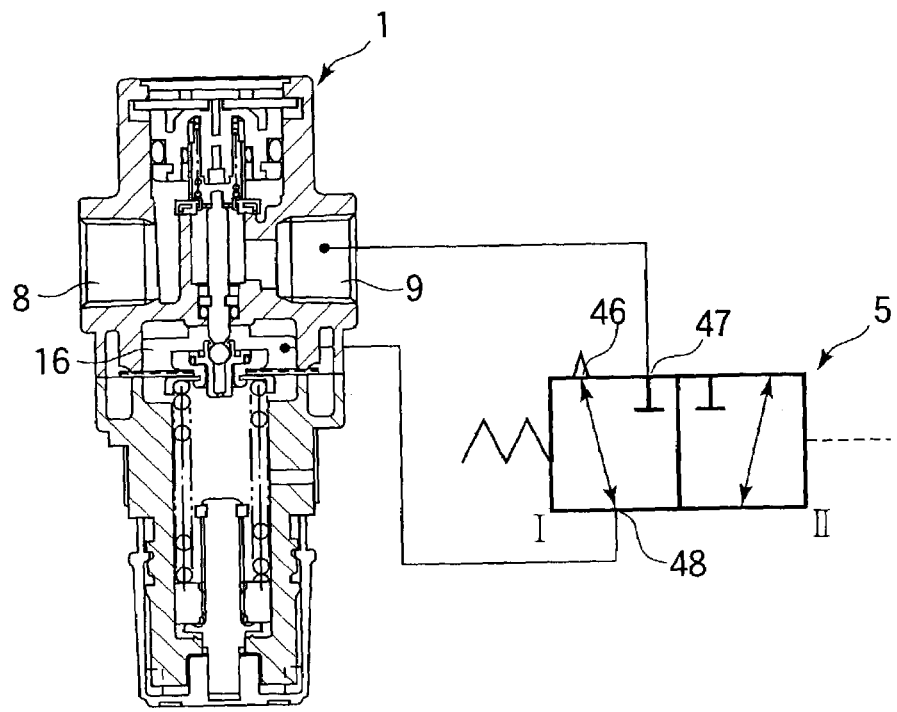
FIG. 4A is an explanatory view of the first embodiment in which a directional control valve is shown by symbols.

FIGS. 1, 2 and 4A show a first embodiment of the pressure control apparatus according to the present invention. It should be noted that FIG. 2 is a sectional view taken along the line X—X in FIG. 1, in which the illustration of a bonnet 7 is partly omitted because the interior of the bonnet 7 is the same as in FIG. 1. The pressure control apparatus has a pressure control apparatus body 1 in which a main valve 2 and a diaphragm 4 are provided. The pressure control apparatus further has a directional control valve 5 provided, for example, outside the pressure control apparatus body 1. The pressure control apparatus body 1 comprises a body member 6 and a bonnet 7. The outer peripheral portion of the diaphragm 4 is held between the body member 6 and the bonnet 7. A supply port 8 and an output port 9 are formed to open on two side surfaces, respectively, of the body member 6. The main valve 2 is disposed in a passage for communication between the supply port 8 and the output port 9. The main valve 2 has a main valve element and a main valve seat. The main valve 2 is urged in a direction in which it is closed by a valve spring 10. More specifically, the body member 6 has a center hole 12 formed therein to open on the top thereof. The center hole 12 is in communication with the supply port 8. The main valve seat is positioned at the bottom of the center hole 12. A valve guide assembly 13 is disposed in the center hole 12. A cover 14 and a cap 15 are disposed at the upper side of the valve guide assembly 13. The valve guide assembly 13 has a valve retainer. The valve spring 10 is fitted between the valve retainer and the main valve element of the main valve 2. The valve spring 10 urges the main valve element in a direction in which it comes in contact with the main valve seat.

A diaphragm chamber 16 is formed by the diaphragm 4. In other words, the diaphragm chamber 16 is formed between the diaphragm 4 and a body partition wall 17. An insertion hole is formed in the center of the body partition wall 17. A central communicating passage 18 is formed between a part of the body partition wall 17 around the insertion hole and the main valve seat of the main valve 2. The central communicating passage 18 is in communication with the output port 9. The proximal end of a stem 19 is connected to the center of the main valve element of the main valve 2. The lower end portion of the stem 19 is slidably inserted in the insertion hole of the body partition wall 17 in an airtight manner. A shell 3 is secured to the center of the diaphragm 4 (in FIGS. 1 to 4A and 4B, a discharge valve is shown by reference numeral 3; however, it is assumed that, in actuality, a disk is provided on the upper side of the diaphragm 4, and a spring retainer is provided on the lower side of the diaphragm 4). The stem 19 is arranged such that the distal end thereof is capable of abutting against the shell 3. The valve spring 10 urges the shell 3 in a direction in which it is depressed through the stem 19.

A pressure regulating spring chamber 20 is formed below the diaphragm 4 in the bonnet 7. A nut 21 is inserted in a lower end position of the pressure regulating spring chamber 20 in such a manner as to be unrotatable but reciprocatable. A pressure regulating spring 22 is fitted between the spring retainer of the shell 3 and the nut 21. The pressure regulating spring 22 urges the main valve 2 in a direction in which it opens through the stem 19. A pressure regulating screw 23 is in engagement with the internal thread of the nut 21. The lower end of the pressure regulating screw 23 is connected to a handle 24. Rotating the handle 24, together with the pressure regulating screw 23, causes the nut 21 to move upward or downward, thereby allowing the urging force of the pressure regulating spring 22 to be adjusted. A discharge port 25 is formed in the side wall of the bonnet 7. The discharge port 25 provides communication between the pressure regulating spring chamber 20 and the atmosphere.

As shown in FIG. 2, adapter connecting openings 26A and 26B are formed in two side surfaces, respectively, of the body member 6 of the pressure control apparatus body 1 (at respective positions 90 degrees off the supply port 8 and the output port 9 in a top plan view). The adapter connecting openings 26A and 26B are multi-stepped holes. That is, the adapter connecting opening 26A has, in order from the outer side thereof, a large-diameter hole 27A, a medium-diameter hole 28A and a small-diameter hole 29A formed adjacent to each other. Similarly, the adapter connecting opening 26B has, in order from the outer side thereof, a large-diameter hole 27B, a medium-diameter hole 28B and a small-diameter hole 29B formed adjacent to each other. The small-diameter holes 29A and 29B are in communication with the central communicating passage 18 through respective pressure communicating passages 30A and 30B. The medium-diameter holes 28A and 28B are in communication with the diaphragm chamber 16 through respective pressure communicating passages 33A and 33B. A connecting projection 34 of an adapter 31 is fitted into the large-diameter hole 27A of the adapter connecting opening 26A in an airtight manner, whereby the adapter 31 is connected to the adapter connecting opening 26A. A hermetically sealing projection 36 of a blanking plate assembly 35 is fitted into the large-diameter hole 27B, the medium-diameter hole 28B and the small-diameter hole 29B of the adapter connecting opening 26B in an airtight manner, whereby the adapter connecting opening 26B is hermetically sealed. It should be noted that the connecting projection 34 of the adapter 31 may be fitted into the large-diameter hole 27B of the adapter connecting opening 26B in an airtight manner, whereby the adapter 31 is connected to the adapter connecting opening 26B. In this case, the hermetically sealing projection 36 of the blanking plate assembly 35 is fitted into the large-diameter hole 27A, the medium-diameter hole 28A and the small-diameter hole 29A of the adapter connecting opening 26A in an airtight manner, whereby the adapter connecting opening 26A is hermetically sealed.

A directional control valve 5 and a pressure gauge 38 are mounted on the outside of the adapter 31. A mounting projection 39 of the pressure gauge 38 is fitted into a mounting hole 40 of the adapter 31 with a seal interposed therebetween. The adapter 31 has a multi-stepped communicating hole 41 for introducing the secondary pressure (pressure at the output port 9) into both the pressure gauge 38 and the directional control valve 5 and for other purposes. The multi-stepped communicating hole 41 has, in order from the inner side thereof, a large-diameter hole 42, a medium-diameter hole 43 and a small-diameter hole 44 provided adjacent to each other. A communicating pipe 45 is fitted in the multi-stepped communicating hole 41 of the adapter 31 and the adapter connecting opening 26A of the body member 6. The left end of the communicating pipe 45 is fitted in the medium-diameter hole 43 of the adapter 31 in a hermetically sealed manner. The right end of the communicating pipe 45 is fitted in the small-diameter hole 29A of the body member 6 in a hermetically sealed manner. The secondary pressure is introduced from the output port 9 into the pressure gauge 38 through the central communicating passage 18, the pressure communicating passage 30A, the internal passage of the communicating pipe 45, the small-diameter hole 44 of the adapter 31 and the internal passage of the mounting projection 39.

As shown in FIGS. 2 and 4A, the directional control valve 5 has small input ports 46 and 47 and a small output port 48. When a spool 49 is in an OFF position I shown in the figure, the small input port 47 is closed, and the small input port 46 and the small output port 48 are allowed to communicate with each other. When the spool 49 is switched to an ON position II against the urging force of a spring by fluid pressure or the like (including human power, machine, pilot pressure, and an electromagnetic operating method; the same shall apply hereinafter), the small input port 46 is closed, and the small input port 47 and the small output port 48 are allowed to communicate with each other. The adapter 31 has input communicating passages 50 and 51 and an output communicating passage 52. The first input communicating passage (input communicating passage 50) provides communication between the small input port 46 and the atmosphere. The input communicating passage 51 provides communication between the small input port 47 and the small-diameter hole 44. The output communicating passage 52 provides communication between the small output port 48 and the large-diameter hole 42. Accordingly, the small input port 47 of the directional control valve 5 is in communication with the output port 9 through the second A input communicating passage (input communicating passage 51 and small-diameter hole 44) of the adapter 31, the internal passage of the communicating pipe 45 and the second B input communicating passage (pressure communicating passage 30A and central communicating passage 18) of the body member 6. The small output port 48 of the directional control valve 5 is in communication with the diaphragm chamber 16 through the first A output communicating passage (output communicating passage 52 and large-diameter hole 42) of the adapter 31 and the first B output communicating passage (large-diameter hole 27A, medium-diameter hole 28A and pressure communicating passage 33A) of the body member 6.

Next, the operation of the first embodiment will be described. When the directional control valve 5 is in the OFF position I, the diaphragm chamber 16 is in communication with the atmosphere through the first B output communicating passage of the body member 6, the first A output communicating passage of the adapter 31, the small output port 48 and the small input port 46 of the directional control valve 5 and the first input communicating passage. Consequently, the pressure in the diaphragm chamber 16 is equal to the atmospheric pressure. The urging force of the pressure regulating spring 22 is much greater than the urging force of the valve spring 10. Accordingly, the urging force of the pressure regulating spring 22 causes the diaphragm 4, the shell 3, the stem 19 and the valve element of the main valve 2 to move upward against the urging force of the valve spring 10. Thus, the main valve 2 is fully open. When a pressure fluid is supplied to the supply port 8, the fluid passes through the main valve 2, which is fully open, the central communicating passage 18 and the output port 9 and flows into a fluid cylinder (not shown). Because the main valve 2 is fully open, the secondary pressure at the output port 9 is equal to the primary pressure at the supply port 8.

When the spool 49 of the directional control valve 5 is switched to the ON position II, the small input port 46 is closed, and the small input port 47 is allowed to communicate with the small output port 48. The secondary pressure flows from the output port 9 to the small input port 47 of the directional control valve 5 through the second B input communicating passage of the body member 6, the internal passage of the communicating pipe 45 and the second A input communicating passage of the adapter 31 and further flows to the diaphragm chamber 16 through the small output port 48 of the directional control valve 5, the first A output communicating passage of the adapter 31 and the first B output communicating passage of the body member 6. Accordingly, the pressure in the diaphragm chamber 16 becomes equal to the secondary pressure. Consequently, the secondary pressure acts on the upper side of the diaphragm 4 with a large area, thereby generating downward force counteracting the urging force of the pressure regulating spring 22. Thus, the pressure fluid reduced in pressure by the main valve 2 flows to the output port 9. When the secondary pressure becomes equal to a set pressure, the diaphragm 4 is depressed to close the main valve 2. When the secondary pressure becomes lower than the set pressure, the main valve 2 opens. Consequently, the pressure fluid from the supply port 8 is reduced in pressure, and the fluid reduced in pressure flows to the output port 9. Thus, the pressure fluid supplied to the supply port 8 is reduced-in pressure to a set pressure by the main valve 2. The fluid reduced in pressure to the set pressure flows into the fluid cylinder (not shown) through the output port 9. The pressure control apparatus according to the first embodiment is applicable to a caulking machine, an automatic door, etc.

Figure 3:
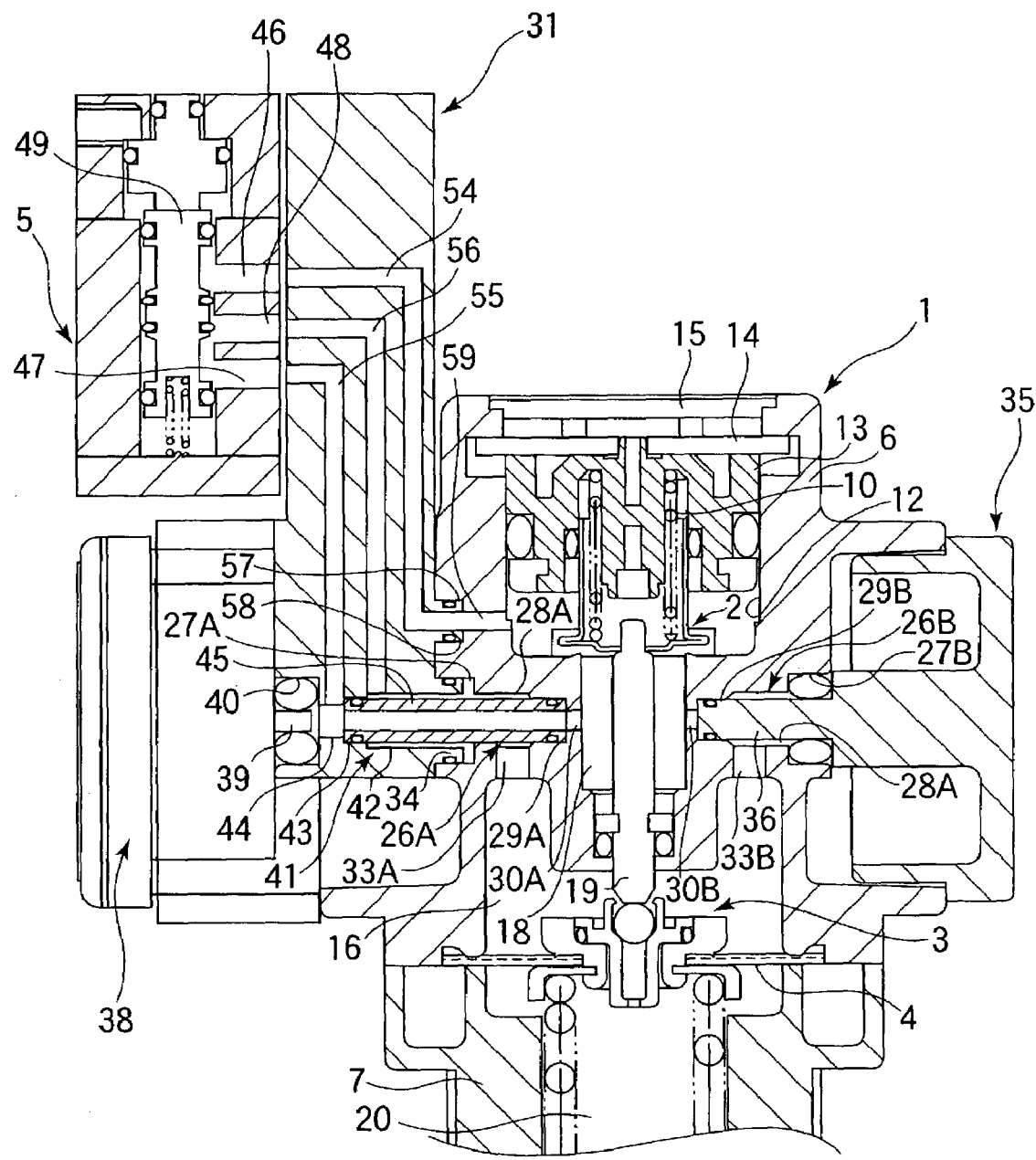
FIG. 3 is a sectional view taken along the line X—X in FIG. 1, showing the second embodiment.
Figure 4B:
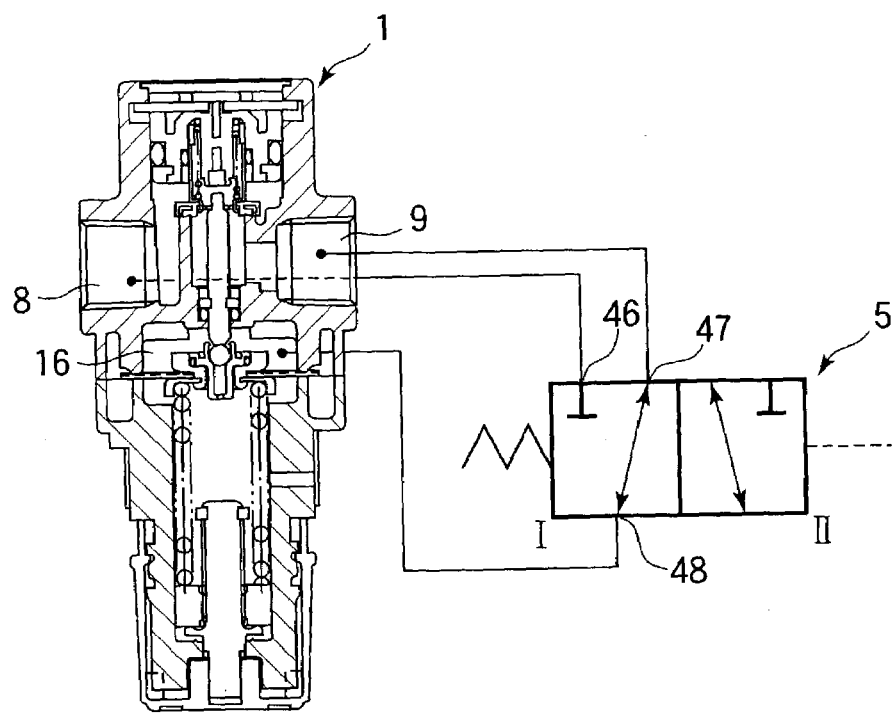
FIG. 4B is an explanatory view of the second embodiment in which a directional control valve is shown by symbols.
Figure 5:
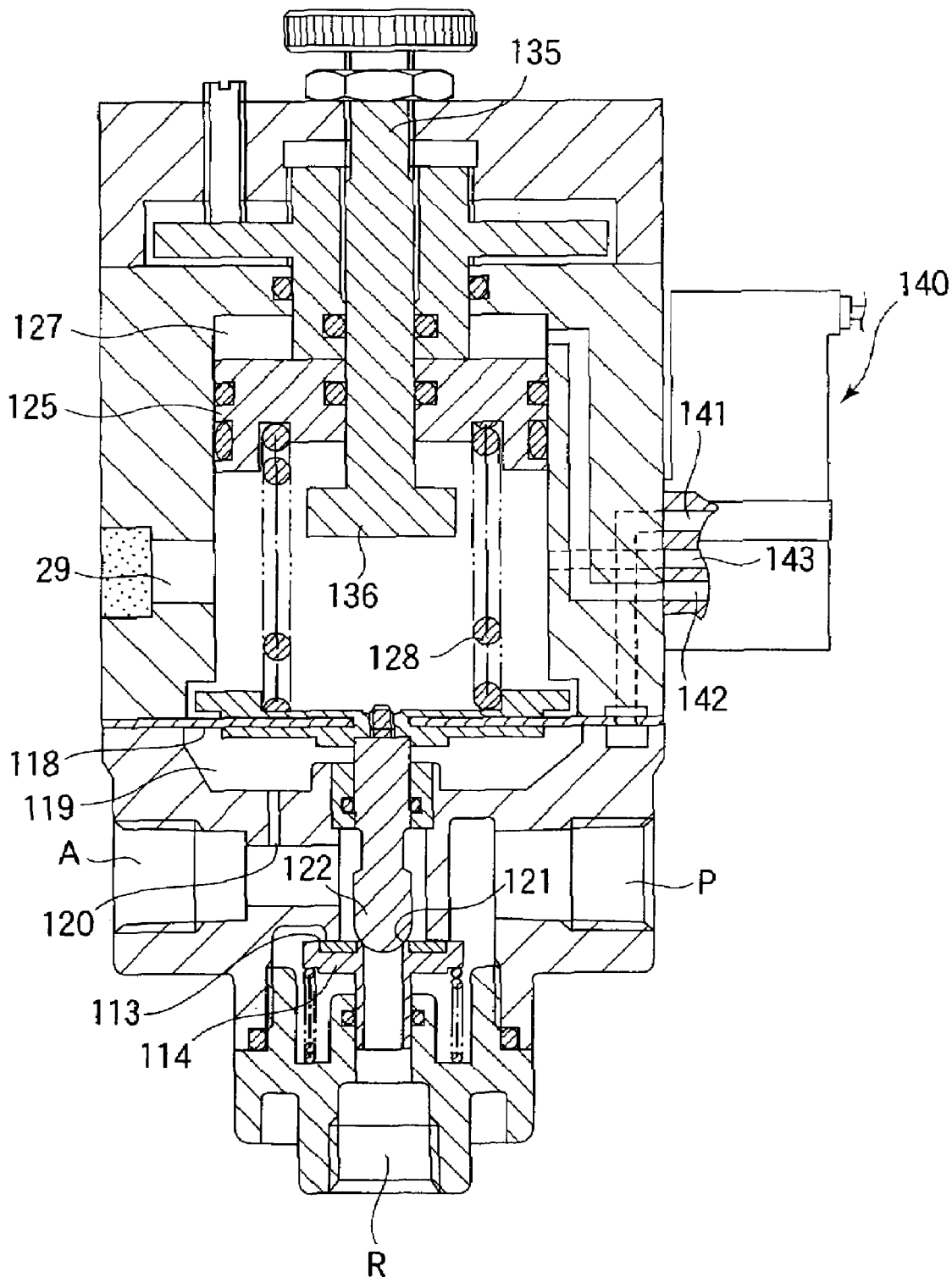
FIG. 5 is a sectional side view of a conventional pressure control apparatus.

FIGS. 1, 3 and 4B show a second embodiment of the pressure control apparatus according to the present invention. It should be noted that FIG. 3 is a sectional view taken along the line X—X in FIG. 1 (second embodiment), in which the illustration of a bonnet 7 is partly omitted because the interior of the bonnet 7 is the same as in FIG. 1. The second embodiment differs from the first embodiment in the arrangement of portions that are communicated with the small input ports 46 and 47 and the small output port 48 of the directional control valve 5. In the other respects, the second embodiment is the same as the first embodiment. In FIGS. 3 and 4B, the same members as those in FIGS. 2 and 4A are denoted by the same reference numerals as those in FIGS. 2 and 4A, and a description of these members will be omitted or given only briefly.

In FIGS. 3 and 4B, the adapter 31 has a communicating projection 57, and the body member 6 has a communicating recess 58. The communicating projection 57 is fitted into the communicating recess 58. The communicating recess 58 is communicated with the center hole 12 through an input communicating passage 59. An end portion of an input communicating passage 54 (described later) is formed in the communicating projection 57. Consequently, the input communicating passage 59 and the input communicating passage 54 are in communication with each other. The directional control valve 5 has small input ports 46 and 47 and a small output port 48. When the spool 49 is in an OFF position I shown in the figure, the small input port 46 is closed, and the small input port 47 and the small output port 48 are allowed to communicate with each other. When the spool 49 is switched to an ON position II by a fluid pressure or the like against the urging force of a spring, the small input port 47 is closed, and the small input port 46 and small output port 48 are allowed to communicate with each other. The adapter 31 has input communicating passages 54 and 55 and an output communicating passage 56. The small input port 46 of the directional control valve 5 is in communication with the supply port 8 through the third A input communicating passage (input communicating passage 54) of the adapter 31 and the third B input communicating passage (input communicating passage 59 and center hole 12) of the body member 6. The small input port 47 of the directional control valve 5 is in communication with the small-diameter hole 44 through the input communicating passage 55 of the adapter 31. The small output port 48 of the directional control valve 5 is in communication with the large-diameter hole 42 through the output communicating passage 56.

Next, the operation of the pressure control apparatus according to the second embodiment will be described. When the directional control valve 5 is in the OFF position I, the diaphragm chamber 16 is in communication with the output port 9 through the first B output communicating passage (pressure communicating passage 33A, medium-diameter hole 28A and large-diameter hole 27A) of the body member 6, the first A output communicating passage (large-diameter hole 42 and output communicating passage 56) of the adapter 31, the small output port 48 and the small input port 47 of the directional control valve 5, the second A output communicating passage (input communicating passage 55 and small-diameter hole 44) of the adapter 31, the internal passage of the communicating pipe 45 and the second B output communicating passage (pressure communicating passage 30A and central communicating passage 18) of the body member 6. When a pressure fluid is supplied to the supply port 8, the secondary pressure is reduced to a set pressure in the same way as in a case where the directional control valve 5 in the first embodiment is set in the ON position II.

When the directional control valve 5 is switched to the ON position II, the small input port 47 is closed, and the small input port 46 is allowed to communicate with the small output port 48. The pressure fluid from the supply port 8 flows into the diaphragm chamber 16 through the third B input communicating passage of the body member 6, the third A input communicating passage of the adapter 31, the small input port 46 and the small output port 48 of the directional control valve 5, the first A output communicating passage of the adapter 31 and the first B output communicating passage of the body member 6. The primary pressure flowing into the diaphragm chamber 16 causes the diaphragm 4 to move downward. Consequently, the main valve 2 is fully closed by the valve spring 10. The pressure control apparatus according to the second embodiment is applicable to an air blower, an air motor, etc.

The first and second embodiments each use a single two-position, three-port directional control valve. In the first embodiment, the diaphragm chamber 16 is placed at the secondary pressure or the atmospheric pressure. In the second embodiment, the diaphragm chamber 16 is placed at the secondary pressure or the primary pressure. However, two series-connected two-position, three-port directional control valves may be used to allow the diaphragm chamber 16 to be placed at any one of the secondary pressure, the atmospheric pressure, and the primary pressure.

What is claimed is:

1. A pressure control apparatus comprising:
    a pressure control apparatus body;
    a main valve and a diaphragm provided in said pressure control apparatus body;
    a directional control valve provided in connection with said pressure control apparatus body;
    a passage for communication between a supply port and an output port, said main valve being disposed in said passage;
    a diaphragm chamber formed by said diaphragm;
    a valve spring for urging said main valve in a direction in which it is closed; and
    a pressure regulating spring acting on said diaphragm to urge said main valve in a direction in which it opens, wherein force acting on said diaphragm changes in accordance with a switching operation of said directional control valve, and hence a pressure at said output port changes;
    wherein said diaphragm chamber and a small output port of said directional control valve are communicated with each other, and in accordance with the switching operation of said directional control valve, said diaphragm chamber is placed at a secondary pressure of said output port or at an atmospheric pressure, wherein when said diaphragm chamber is at the secondary pressure, a primary pressure flows to said output port after being reduced to a set pressure by said main valve, and when said diaphragm chamber is at the atmospheric pressure, said main valve fully opens.

2. A pressure control apparatus according to claim 1, further comprising:
    a shell disposed in a center of said diaphragm; and
    a stem connected at a proximal end thereof to a main valve element of said main valve and disposed so that a distal end of said stem abuts against said shell.

3. A pressure control apparatus according to claim 1, wherein said directional control valve has two small input ports, one of said small input ports being communicated with an atmosphere, and the other of said small input ports being communicated with the output port of said pressure control apparatus body.

4. A pressure control apparatus according to claim 3, further comprising:
    an adapter provided on a side of said pressure control apparatus body, said directional control valve being connected to an outside of said adapter;
    wherein the small output port of said directional control valve is communicated with said diaphragm chamber through a first A output communicating passage formed in said adapter and a first B output communicating passage formed in said pressure control apparatus body, and one of said small input ports of said directional control valve is communicated with the atmosphere through a first input communicating passage formed in said adapter, and wherein a second A input communicating passage is formed in said adapter, and a second B input communicating passage is formed in said pressure control apparatus body, said second A input communicating passage and said second B input communicating passage being communicated with each other through a communicating pipe, and the other of said small input ports of said directional control valve is communicated with the output port of said pressure control apparatus body through said second A input communicating passage, said communicating pipe and said second B input communicating passage.

5. A pressure control apparatus including:
a pressure control apparatus body;
a main valve and a diaphragm provided in said pressure control apparatus body;
a directional control valve provided in connection with said pressure control apparatus body;
a passage for communication between a supply port and an output port, said main valve being disposed in said passage;
a diaphragm chamber formed by said diaphragm;
a valve spring for urging said main valve in a direction in which it is closed; and
a pressure regulating spring acting on said diaphragm to urge said main valve in a direction in which it opens, wherein force acting on said diaphragm changes in accordance with a switching operation of said directional control valve, and hence a pressure at said output port changes;
said pressure control apparatus comprising:
a central communicating passage formed in the passage for communication between said main valve and said output port:
adapter connecting openings formed in two side surfaces, respectively, of said pressure control apparatus body, said adapter connecting openings being communicated with said central communicating passage through respective pressure communicating passages;
an adapter connected to one of said adapter connecting openings;
a pressure gauge provided in said adapter so that the pressure at said output port is transmitted to said pressure gauge through said central communicating passage and said pressure communicating passage; and
a blanking plate assembly for closing the other of said adapter connecting openings.

6. A pressure control apparatus comprising:
a pressure control apparatus body;
a main valve and a diaphragm provided in said pressure control apparatus body;
a directional control valve provided in connection with said pressure control apparatus body;
a passage for communication between a supply port and an output port, said main valve being disposed in said passage;
a diaphragm chamber formed by said diaphragm;
a valve spring for urging said main valve in a direction in which it is closed; and
a pressure regulating spring acting on said diaphragm to urge said main valve in a direction in which it opens, wherein force acting on said diaphragm changes in accordance with a switching operation of said directional control valve, and hence a pressure at said output port changes;
wherein said diaphragm chamber and a small output port of said directional control valve are communicated with each other, and in accordance with the switching operation of said directional control valve, said diaphragm chamber is placed at a secondary pressure of said output port or at a primary pressure of said supply port, wherein when said diaphragm chamber is at the secondary pressure, the primary pressure flows to said output port after being reduced to a set pressure by said main valve, and when said diaphragm chamber is at the primary pressure, said main valve is fully closed;
wherein said directional control valve has two small input ports, one of said small input ports being communicated with the supply port of said pressure control apparatus body, and the other of said small input ports being communicated with the output port of said pressure control apparatus body;
an adapter provided on a side of said pressure control apparatus body, said directional control valve being connected to an outside of said adapter;
wherein the small output port of said directional control valve is communicated with said diaphragm chamber through a first A output communicating passage formed in said adapter and a first B output communicating passage formed in said pressure control apparatus body, and one of said small input ports of said directional control valve is communicated with the supply port of said pressure control apparatus body through a third A input communicating passage formed in said adapter and a third B input communicating passage formed in said pressure control apparatus body, and wherein a second A input communicating passage is formed in said adapter, and a second B input communicating passage is formed in said pressure control apparatus body, said second A input communicating passage and said second B input communicating passage being communicated with each other through a communicating pipe, and the other of said small input ports of said directional control valve is communicated with the output port of said pressure control apparatus body through said second A input communicating passage, said communicating pipe and said second B input communicating passage.

* * * * *